United States Patent
Sorrentino et al.

(10) Patent No.: US 10,674,479 B2
(45) Date of Patent: Jun. 2, 2020

(54) RESOURCE SELECTION AND RESELECTION FOR DIRECT COMMUNICATIONS BETWEEN DEVICES

(71) Applicant: Telefonaktiebolaget LM Ericsson (publ), Stockholm (SE)

(72) Inventors: Stefano Sorrentino, Solna (SE); Ricardo Blasco Serrano, Espoo (FI); Hieu Do, Järfälla (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 20 days.

(21) Appl. No.: 15/755,143

(22) PCT Filed: Sep. 22, 2015

(86) PCT No.: PCT/SE2015/050986
§ 371 (c)(1),
(2) Date: Feb. 26, 2018

(87) PCT Pub. No.: WO2017/052426
PCT Pub. Date: Mar. 30, 2017

(65) Prior Publication Data
US 2018/0249444 A1      Aug. 30, 2018

(51) Int. Cl.
*H04W 72/02*      (2009.01)
*H04W 84/18*      (2009.01)
(Continued)

(52) U.S. Cl.
CPC .......... *H04W 72/02* (2013.01); *H04W 24/08* (2013.01); *H04W 72/06* (2013.01); *H04W 84/18* (2013.01)

(58) Field of Classification Search
None
See application file for complete search history.

(56) References Cited

U.S. PATENT DOCUMENTS

2013/0294262 A1    11/2013  Jose et al.
2015/0215903 A1*    7/2015  Zhao ............... H04W 72/04
                                                            370/329
(Continued)

FOREIGN PATENT DOCUMENTS

EP        2914026 A1     9/2015

OTHER PUBLICATIONS

Hsu, Chin-Wei et al., "Design and Analysis for Effective Proximal Discovery in Machine-to-Machine Wireless Networks", ICC'14—W7: Workshop on M2M Communications for Next Generation IoT, Jun. 10, 2014, 477-482.

(Continued)

*Primary Examiner* — Michael J Moore, Jr.
(74) *Attorney, Agent, or Firm* — Patent Portfolio Builders, PLLC (57) ABSTRACT

Methods and apparatus for resource allocation in a D2D network (100) are disclosed for reducing resource collisions among wireless devices (200) engaged in device-to-device (D2D) communications. In D2D communications, each wireless device (200) selects a radio resource for signal transmissions and retains the selected resource until a reselection becomes necessary. During the transmission, the wireless device (200) detects a triggering condition for resource reselection. Responsive to the triggering condition, the wireless device (200) performs resource reselection according to a reselection rule that is designed to reduce resource collisions among wireless devices (200).

45 Claims, 7 Drawing Sheets

(51) Int. Cl.
*H04W 24/08* (2009.01)
*H04W 72/06* (2009.01)

(56) References Cited

U.S. PATENT DOCUMENTS

| | | | | |
|---|---|---|---|---|
| 2015/0264677 A1* | 9/2015 | He | | H04W 72/02 |
| | | | | 370/312 |
| 2016/0044737 A1* | 2/2016 | Kwon | | H04W 76/14 |
| | | | | 370/328 |
| 2016/0057604 A1* | 2/2016 | Luo | | H04W 8/005 |
| | | | | 370/330 |
| 2016/0066337 A1* | 3/2016 | Sartori | | H04W 76/14 |
| | | | | 370/329 |
| 2016/0270053 A1* | 9/2016 | Zeng | | H04W 72/048 |
| 2016/0295624 A1* | 10/2016 | Novlan | | H04W 76/14 |
| 2016/0302250 A1* | 10/2016 | Sheng | | H04W 4/70 |
| 2016/0338094 A1* | 11/2016 | Faurie | | H04W 72/085 |
| 2016/0338095 A1* | 11/2016 | Faurie | | H04W 28/0278 |
| 2017/0048888 A1* | 2/2017 | Belleschi | | H04W 8/005 |
| 2017/0055240 A1* | 2/2017 | Kim | | H04W 76/14 |
| 2017/0070924 A1* | 3/2017 | Wu | | H04W 36/08 |
| 2017/0142741 A1* | 5/2017 | Kaur | | H04W 56/002 |
| 2017/0347339 A1* | 11/2017 | Yasukawa | | H04W 72/04 |
| 2018/0063825 A1* | 3/2018 | Van Phan | | H04W 52/0216 |
| 2018/0206211 A1* | 7/2018 | Seo | | H04W 72/02 |
| 2019/0045345 A1* | 2/2019 | Lee | | H04J 11/00 |

OTHER PUBLICATIONS

"Mode 2 resource allocation for D2D", 3GPP TSG RAN WG1 Meeting #78, R1-142839, Dresden, Germany, Aug. 18-22, 2014, 1-6.

"Resource management for type 1 discovery", 3GPP TSG-RAN WG1 #74bis, R1-134630, Guangzhou, China, Oct. 7-11, 2013, 1-7.

* cited by examiner

RESOURCE SELECTION AND RESELECTION FOR DIRECT
COMMUNICATIONS BETWEEN DEVICES

TECHNICAL FIELD

This present application relates generally to device-to-device (D2D) communications, and more specifically, to resource allocation among devices engaging in D2D communications.

BACKGROUND

The Long Term Evolution (LTE) Release 12 (Rel-12) standard under consideration by the Third Generation Partnership Project (3GPP) provides support for device-to-device (D2D) communications targeting both commercial and public safety applications. Devices configured for D2D communications can communicate directly with one another without an intervening base station. One application for D2D communications is direct vehicle-to-vehicle (V2V), vehicle-to-infrastructure (V2I), and vehicle-to-pedestrian (V2P) communications. D2D communications involving at least one vehicle are referred to generally as vehicle-to-device (V2x) communications. V2x communications may take advantage of network infrastructure when available, but direct V2x communications should be possible when no network is available.

V2x communications have been proposed for road safety applications, in addition to general communications. For instance, the European Telecommunications Standards Institute (ETSI) has defined two types of messages for road safety applications: the Co-operative Awareness Message (CAM) and the Decentralized Environment Notification Message (DENM). CAMs enable emergency vehicles or other vehicles to broadcast warning messages to notify other devices of its presence. CAMs can also be used to improve safety under normal traffic conditions. DENMs are event-triggered messages, which may be triggered by braking, turning, acceleration, deceleration, or similar events. CAMs and DENMs may target vehicles, pedestrians, and/or infrastructure. Under the ETSI standard, a device may be configured to check for CAMs and/or DENMs every 100 ms. The detection latency for CAMs and DENMs is 100 ms, which is longer than the 50 ms detection latency required for pre-crash sensing. The package size of CAMs and DENMs varies from about 100 to more than 800 bytes and the typical size is about 300 bytes. Ideally, CAMs and DENMs should be detected by all vehicles in proximity to the vehicle broadcasting the message.

Besides the ETSI, other regulating organizations have also provided standards defining D2D messages aimed at improving road safety. For example, the Society of Automotive Engineers (SAE) has also defined a message for V2x communications known as the Basic Safety Message (BSM). BSMs may be classified into different priority levels based on the importance or urgency of the message.

In D2D networks, and especially V2x networks, devices typically share a pool of radio resources that are accessed on a contention basis, with limited supervision or control by the network. A distributed resource allocation scheme is used where devices select resources for transmissions from a shared resource pool on a contention basis after a sensing operation of the radio environment. Ideally, the distributed resource allocation converges to a stable equilibrium point that efficiently utilizes the radio resources.

One concern with distributed resource allocation schemes, particularly for V2x communications, is that the radio conditions are constantly changing and that devices must reselect radio resources as the radio conditions change. The selection or reselection of radio resources by one device may affect the selection or reselection of radio resources by other devices. In this case, the distributed resource allocation may not converge to a stable solution even in this absence of mobility. Unstable resource allocation and can lead to degraded performance and inefficient use of the radio resources.

Another concern with distributed resource allocation is that many wireless devices operate in a half-duplex mode, which means that the wireless devices cannot transmit and receive at the same time. Two devices in close proximity may experience similar radio conditions and thus select the same radio resources for transmissions, which is sometimes referred to as a collision. If two devices operating in half-duplex mode select the same radio resources for transmission, they will not be able to communicate with each other. This problem may be mitigated by randomizing resource selection at each device to minimize the likelihood of selecting the same radio resources. However, randomizing the resource selection may prevent the distributed resource allocation from converging to a stable solution.

SUMMARY

The present disclosure relates to resource selection for D2D communications enabling direct communication between devices without assistance of a network to relay communications between the devices. Generally, each wireless device selects a radio resource for signal transmissions and retains the selected resource until a reselection is necessary. Techniques are presented for introducing an element of randomness to the reselection process to avoid collisions without destabilizing the distributed resource allocation.

Exemplary embodiments of the disclosure comprise methods of selecting radio resources by a device for device-to-device communications with one or more other devices. In one embodiment, the method comprises selecting a first radio resource form a shared pool of radio resources for transmission of signals according to a selection rule; performing measurements on the first radio resource and one or more candidate radio resources in the shared pool of radio resources; detecting a triggering condition based at least in part on the measurements; and responsive to the detection of the triggering condition, reselecting (420) a second radio resource from the one or more candidate radio resources according to a reselection rule.

In some embodiments of the method, selecting a first radio resource form a shared pool of radio resources for transmission of signals according to a selection rule comprises selecting a radio resource based on a first utility function.

In some embodiments of the method, selecting a first radio resource based on a first utility function comprises selecting one of said radio resources from the shared pool of radio resources that maximizes the first utility function as the first radio resource.

In some embodiments of the method, selecting a first radio resource based on a first utility function comprises ranking available radio resources in the shared pool of radio resources based on the first utility function; and selecting one of the available radio resources from among the n highest ranked radio resources.

In some embodiments of the method, selecting one of the available radio resources from among the n highest ranked radio resources comprises randomly selecting one of the available radio resources from among the n highest ranked radio resources.

In some embodiments of the method, selecting one of the available radio resources from among the n highest ranked radio resources comprises selecting one of the available radio resources from among the n highest ranked radio resources according to a device-specific pattern.

In some embodiments of the method, reselecting a second radio resource from the one or more candidate radio resources according to a reselection rule comprises reselecting the second radio resource based on a second utility function In some embodiments of the method, reselecting a second radio resource based on a first utility function comprises reselecting one of said radio resources from the shared pool of radio resources that maximizes the second utility function as the second radio resource.

In some embodiments of the method, reselecting a second radio resource based on a second utility function comprises ranking available radio resources in the shared pool of radio resources based on the second utility function; and reselecting one of the available radio resources from among the n highest ranked radio resources.

In some embodiments of the method, reselecting one of the available radio resources from among the n highest ranked radio resources comprises randomly selecting one of the available radio resources from among the n highest ranked radio resources.

In some embodiments of the method, reselecting one of the available radio resources from among the n highest ranked radio resources comprises selecting one of the available radio resources from among the n highest ranked radio resources according to a device-specific pattern.

In some embodiments of the method, the first utility function and the second utility functions are different.

In some embodiments of the method, reselecting a second radio resource from the one or more candidate radio resources according to a reselection rule comprises reselecting a second radio resource according to a device-specific reselection rule to reduce resource collision between the device and other devices.

In some embodiments of the method, reselecting a second radio resource from the one or more candidate radio resources according to a device-specific reselection rule comprises reselecting the second radio resource according to a device-specific pattern.

In some embodiments of the method, the first radio resource comprises both time and frequency resources, and wherein the device-specific pattern comprises a circular shift of the time resource by a device-specific number of time units.

In some embodiments of the method, reselecting a second radio resource from the one or more candidate radio resources according to a device-specific reselection rule comprises reselecting the second radio resource based on a time of the first radio resource, a frequency of the first radio resource, or both.

In some embodiments of the method, the triggering condition is based on a utility of the first radio resource, a utility of the second radio resource, or both, and wherein the utility of the first radio resource and the utility of the second radio resource are based on the measurements.

In some embodiments of the method, the utility of the first radio resource and the utility of the second radio resource are based on respective utility functions that are different.

In some embodiments of the method, the triggering condition comprises a condition that the utility of the first radio resource is below a first threshold that the utility of the second radio resource is above a second threshold, or both.

In some embodiments of the method, the triggering condition comprises a condition that the difference between the utility of the second radio resource and that of the first radio resource exceeds a threshold.

In some embodiments of the method, the triggering condition comprises a condition that the difference between a first measurement performed on the first radio resource and a second measurement performed on the second radio resource exceeds a threshold.

In some embodiments of the method, the first and second measurements comprise interference measurements.

In some embodiments of the method, the triggering condition is further based on a time threshold.

Other embodiments of the disclosure comprise a device configured for device-to-device communications. In one embodiment, the device comprises interface circuit for communicating with other devices and a processing circuit configured to select resources for D2D communications. The processing circuit may configured to perform resource selection according to any of the above described methods.

Other embodiments of the disclosure comprise a computer program product comprising program code stored in a computer readable medium, that when executed by a processing circuit in a device, causes the device to perform any one of the methods hereinabove described.

DETAILED DESCRIPTION

The present disclosure relates to resource selection for D2D communications enabling direct communication between devices without the assistance of a network to relay communications between the devices. Generally, each wireless device selects a radio resource for signal transmissions and retains the selected resource until a reselection is necessary. Techniques are presented for introducing an element of randomness into the reselection process to avoid collisions without destabilizing the distributed resource allocation.

Figure 1:
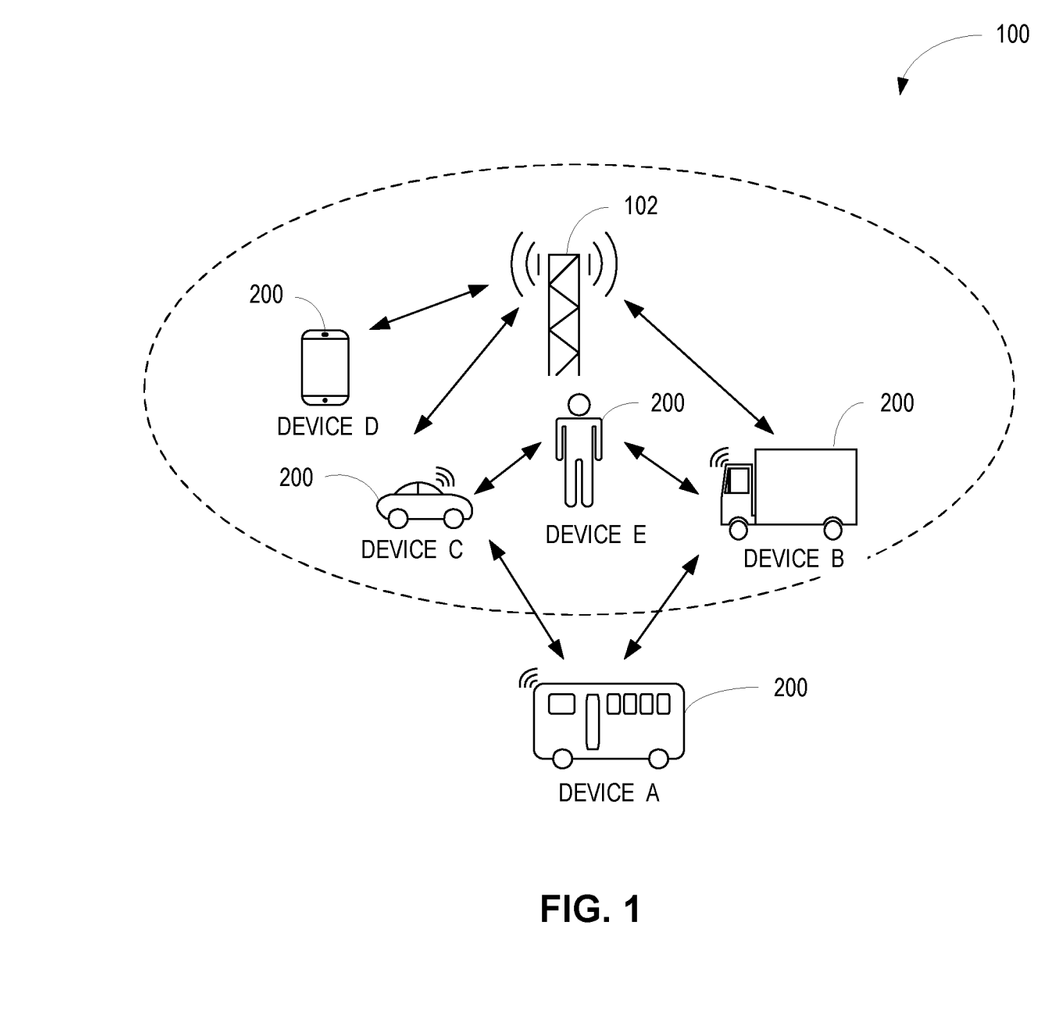
FIG. 1 illustrates an exemplary device-to-device communications network configured for D2D communications.

FIG. 1 illustrates an exemplary D2D network 100 that supports D2D communications. The network 100 comprises a wireless communication network 102 and a plurality of wireless devices 200 configured for D2D communications including devices A-C installed on vehicles, device D installed on a road fixture, and device 200E carried by a pedestrian. In the exemplary embodiment described herein, the wireless communication network 102 comprises an LTE Rel-12 network supporting D2D communications. Those skilled in the art will appreciate, however, that the resource allocation techniques herein described are applicable to any type of wireless communication network that support D2D communications.

The wireless devices 200 are configured to communicate directly with each other without the assistance of the communication network 102 to relay communications. The wireless devices 200 implement a device discovery protocol, which enables the wireless devices 200 to detect other wireless devices 200 that are in close proximity. More particularly, the wireless devices 200 are configured to broadcast and detect discovery messages that carry the device identity of the originating wireless device 200. The discovery messages may also carry an application identity associated with a D2D application. When a broadcast discovery message is detected, the detecting wireless device 200 that received the discovery message may establish a direct communication link with the originating wireless device 200 that broadcast the discovery message.

The wireless devices 200 may also be configured to communicate over the LTE network 102 when network coverage is available. In one exemplary embodiment, the wireless devices 200 are configured with an LTE-based V2x interface to take advantage of the LTE network infrastructure when network coverage is available.

The wireless devices 200 are allocated a pool of shared radio resources from which the wireless devices 200 select radio resources for transmission on a contention basis. In some embodiments, a hybrid resource allocation scheme may be used where the LTE network 102 allocates, from its own radio resources, a pool of shared radio resources for use by wireless devices 200 and the wireless devices 200 select radio resources from the shared resource pool. The shared resource pool may be dynamically updated over time depending on the number of wireless devices. In other embodiments, the wireless devices 200 may be allocated a pool of radio resources that are separate from the resources available to the LTE network 102. In either case, the shared pool of radio resources may comprise contiguous or non-contiguous time/frequency resources.

Figure 2:
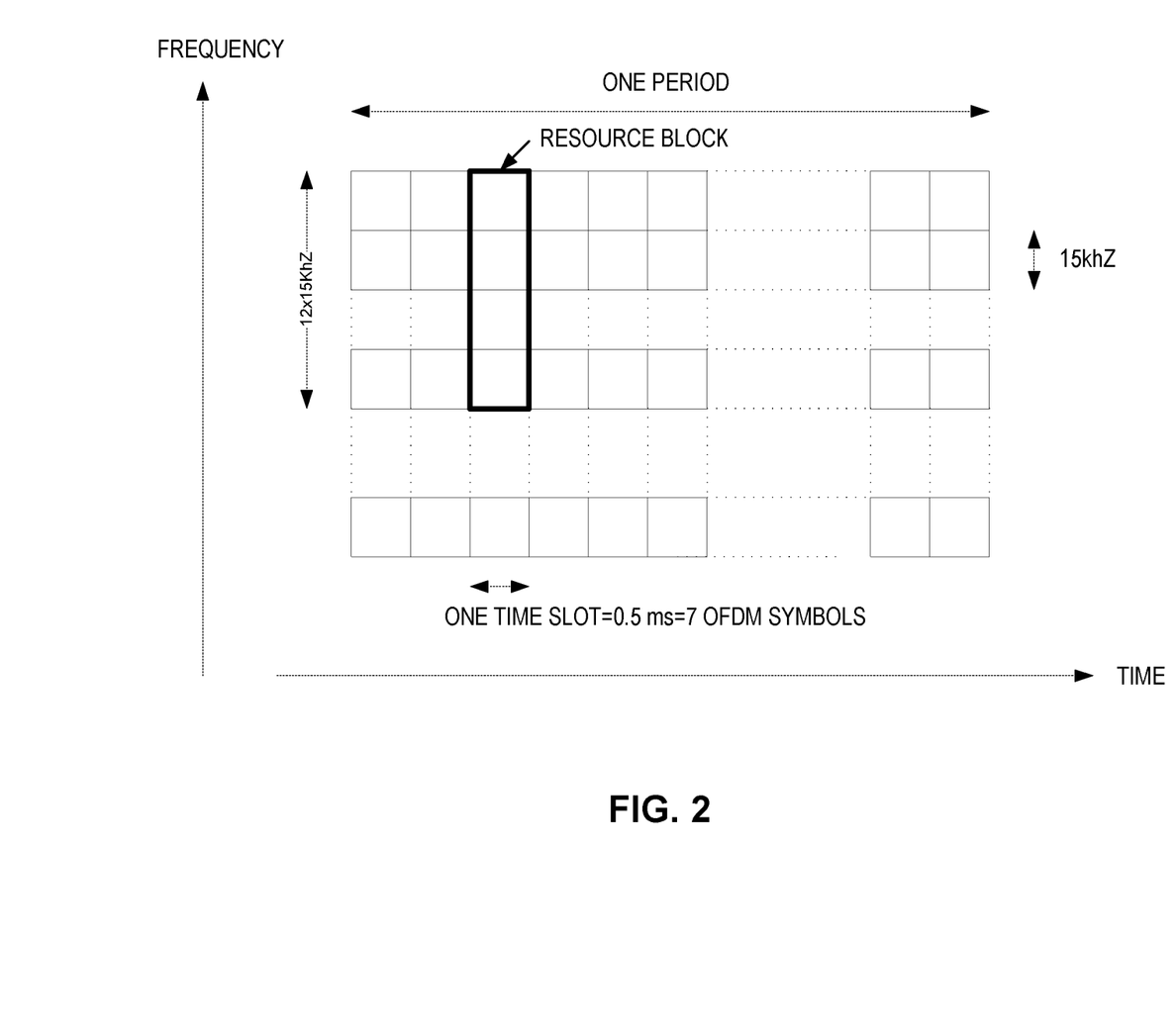
FIG. 2 illustrates a block of radio resources shared among multiple wireless devices engaging in D2D communications.

The shared radio resources available for use by the wireless devices 200 may be viewed as a time-frequency gird. FIG. 2 depicts an exemplary time-frequency grid representing the shared radio resources for D2D communications. The radio resources are divided into a plurality of time periods in the time domain and a plurality of frequencies in the frequency domain. Each time period is further divided into 0.5 ms time slots. For a normal cyclic prefix, a time slot comprises 7 OFDM symbols.

The radio resources are typically allocated in groups called resource units that span a subset of the shared radio resources. The resource units are multiplexed in both time and frequency domains. For example, multiple resource units in the same time slot may be multiplexed in different frequencies in the frequency domain. Similarly, multiple resource units of the same frequency may be multiplexed in different time slots in the time domain. In one exemplary embodiment, a resource selection is selected for a recurring time period, which comprises multiple time slots. In one embodiment, a resource unit may comprise a resource block, which is a unit spanning one time slot and 12 frequencies.

Generally, when a resource is selected for a transmission, the wireless device 200 continues using the same time slot and frequency in each time period until the transmission is finished. After the transmission is complete, the resources are released. As will be described in more detail below, the wireless device 200 may reselect resources during a transmission, which means that the time slot, frequency, or both used for the transmission may before the transmission is complete.

A number of distributed resource selection strategies for allocating radio resources are possible. In general, a wireless device 200 is configured to select a resource that maximizes a first predefined utility function. The selection rule is given generally by:

$$Ru^*(t) = \mathrm{argmax}_{Ru(t)}\{J(Ru(t), Mu(t))\}, \qquad \text{Eq. (1)}$$

where u is an index indicating the device 200, $Ru^*(t)$ is the selected resource, $Ru(t)$ is a candidate resource available for selection by device u, $Mu(t)$ is a corresponding measurement of the radio environment performed by the device u, and $J(.)$ is a utility function. At a given time t, the utility function $J(.)$ gives a utility given $Ru(t)$ and $Mu(t)$ as inputs. In general, the device 200 is configured to select at time t the radio resource $Ru(t)$ that maximizes the utility function $J(.)$.

The radio environment being measured by the device 200 is in part a result of the resource selections performed by other wireless devices 200 in the network 100. Thus, the measurement $Mu(t)$ reflects the effect of the resource selections performed by other devices 200 in the network 100. Also, because wireless devices 200 typically transmit intermittently and may be moving, the radio conditions do not remain constant over time. Thus, $Mu(t)$ is time variant and is coupled with the resource selections made by other devices 200. The optimal resource $Ru^*(t)$ given by Equation (1) will therefore vary over time. Therefore, a reselection of the radio resources used for transmissions is likely to be needed as the radio conditions change.

Another complication arises from the half-duplex operation of many wireless devices 200. A wireless device 200 operating in half-duplex mode cannot transmit and receive at the same time. Thus, when a wireless device 200 transmits, it will not be able to receive signals from other wireless devices 200. Conversely, when a wireless device 200 receives it will not be able to transmit. In V2x networks, wireless devices 200 broadcast messages to the surrounding environment. In the case where two or more wireless devices 200 are in close proximity to each other, they may miss messages transmitted by other wireless devices 200 using the same time resource for transmitting. This scenario is referred to herein as radio frequency (RF) blocking because a wireless device 200 that is transmitting cannot receive messages from other wireless devices 200 transmitting on the same time resource. Thus, a wireless device 200 may miss discovery messages and thus fail to detect the presence of other wireless devices 200. In V2x applications, the wireless device 200 may miss CAM or DENM messages, which could lead to potentially hazardous situations, such as vehicle collisions. Therefore, an efficient resource allocation algorithm in which wireless devices 200 in proximity of each other use different time resources to transmit is one consideration for V2x networks.

One solution to the RF blocking problem is to design patterns for radio resource selection, which dictate how a wireless device 200 selects the radio resources for the next time period. In the current LTE Rel-12 standard, the selection is purely random, meaning that the radio resource is selected for the next time period randomly from the D2D resource pool. While this solution reduces continuous RF blocking of wireless devices 200, it may lead to instability and undesirably poor performance because the wireless devices 200 cannot predict future resource utilization by other users when performing distributed resource allocation.

In order to improve the solution to the RF blocking problem, it is useful to differentiate between resource selection, and resource reselection. Resource selection refers to the selection of a transmission resource by a wireless device 200 that has not previously selected radio resources in a recent or preceding time period. Resource reselection refers to the selection of radio resources within resource pool with time index t for a wireless device 200 that has previously allocated radio resources in a previous time period (e.g., at time index t−1).

The initial resource selection could be performed according to Equation (1), meaning that the wireless device 200 selects the resource that optimizes the utility function J(.). In another example, the wireless device 200 may rank the set of candidate radio resources based on the utility function J(.) and select a resource from the n highest ranked resources, either at random or according to a pattern. Once the radio resources for transmitting are selected, the wireless device 200 should continue using the selected radio resources until a resource reselection is triggered, which will be described in more detail below. Over time, the radio resources selected by the wireless device 200 may no longer be optimal with respect to Equation (1) due to changes in radio environment. But, stability of the distributed resource allocation in the D2D network 100 is improved by requiring each wireless device 200 to retain its selected radio resources until the triggering condition is satisfied.

A reselection of radio resources is performed only when a triggering condition is satisfied. In some embodiments, the reselection rule may be based on a utility function, which may be similar to the selection rule used by the wireless device 200 to select the initial radio resource for the transmission. For example, the reselection rule may direct the wireless device 200 to reselect a resource that maximizes a second predefined utility function. The reselection rule is given generally by:

$$Ru^*(t) = \mathrm{argmax}_{Ru(t)} \{Jr(Ru(t), Ru(t-1), Mu(t))\} \qquad \text{Eq. (2)}$$

where Ru(t) and Mu(t) are similarly defined as in Equation (1), Ru(t−1) represents the radio resource selected at time t−1, and Jr(.) represents the utility function for reselection. In some embodiments, Ru(t−1) is not included in the utility function Jr(.). Similarly to the initial resource selection, the wireless device 200 may rank the candidate radio resources based on the utility function and select one of the n highest ranked radio resources at random or according to a pattern. In most instances, the utility function Jr(.) for reselection is different from the utility function J(.) for the initial selection. For example, the utility function Jr(.) may be constrained to reselect only the frequency resource or only the time resource. The utility function may also take into account different measurements or other information not used in the initial resource selection. However, in some embodiments, the utility function Jr(.) for reselection may be the same as the utility function J(.) for the initial resource selection.

One criteria for a suitable reselection rule is that reselection rule should reduce or minimize resource collisions between devices that are located near each other. The measurements of the radio environment obtained by closely located devices may be correlated. A suitable resource reselection algorithm should prevent these closely located devices from choosing the same resource.

In some embodiments, the reselection rule may be device-specific. For example, the reselection rule may comprise device-specific patterns for resource reselection. In one embodiment, the device-specific pattern comprises a circular shift of the time resource by k units, where k represents the number of time slots and varies for different wireless devices 200. The reselection rule may introduce partial randomization to the reselection process. In other embodiments, the reselection rule may restrict the set of candidate resources available for reselection. The restriction may be based on the radio resources that are currently in-use. For example, the restriction may limit reselection to only time or frequency resources. For example, the time index of the resources for reselection may be restricted by the frequency index of the resources used prior to reselection. In some embodiments, the reselection rule directs the device 110 to reselect a resource by circular shifting the time resource of the resource currently in-use, by a number of time units. The number of time units may be device specific.

As previously noted, a resource reselection according to some embodiments is performed only when a triggering condition is satisfied. The triggering condition may be expressed as Boolean-valued function given by:

$$T(t) = F(Ru(t), Ru(t-1), Mu(t)) \qquad \text{Eq. (3)}$$

If the triggering condition is false, the resources are not reselected and the wireless device 200 continues to use the previously allocated resource, i.e. Ru(t)=Ru(t−1). The triggering condition is an indication that the previously selected resource may no longer be optimal. The triggering condition may be based on time, measurements of the radio environment, the utility of a current resource selection, the utility of a new resource selection, or a combination thereof. An advantage of conditioning the reselection on a triggering condition is that the distributed resource allocation tends to be more stable.

In some embodiments, the triggering condition may be based on a time threshold. In this case, the wireless device 200 may set a timer after each selection or reselection and perform the reselection only after the time threshold is reached. The time threshold may comprise an integer multiple of the time period used for resource allocation. The time threshold can be tuned to prevent the resource allocation in the D2D network 100 from continuously changing while reducing RF blocking.

In some embodiments, the triggering condition may be based on measurements of the radio environment. For example, the wireless device 200 may perform measurements of the interference on the currently used resources and/or other resources in the resource pool that are candidates for reselection. In this case, the triggering condition may be given by:

$$T(t) = \begin{cases} \text{true} & \text{if } I(Ru(t-1)) - I(Ru(t)) \geq I_{thres} \\ \text{false} & \text{otherwise} \end{cases} \qquad \text{Eq. (4)}$$

where I(Ru(t−1)) is the measured interference on the currently used resource, I(Ru(t)) is the measured interference on the candidate resource, and $I_{thres}$ is a predefined interference threshold. If the difference $I(Ru(t-1))-I(Ru(t))$ exceeds the interference threshold $I_{thres}$, $T(t)$ will be true and resource reselection is carried out.

In other embodiments, the triggering condition may be based on the utility of the current resource allocation, the utility of a new resource allocation, or both. The utility of a radio resource may be evaluated based on a utility function as previously described. A reselection may be triggered when one or more of the following conditions is met:
- the utility of the current resource allocation is below a utility threshold;
- the utility of a new resource allocation exceeds a utility threshold;
- the utility of the current resource allocation is below a first utility threshold and the utility of a new resource allocation exceeds a second and possibly higher utility threshold; or
- the difference between the utility of a new resource allocation and the utility of the current resource allocation exceeds a threshold.

In some embodiments, the triggering condition based on a utility may further include a time limitation. That is, resource reselection is triggered only if the condition is fulfilled over a certain period of time.

The triggering condition may include more than one event. In some embodiments, the triggering condition may comprise both a time threshold requirement and a second requirement based on the measurements, such as a signal quality or utility requirement. The wireless device is constrained to wait until a time-threshold is reached. When the time threshold is reached, the wireless device waits until the second condition is satisfied to perform the reelection.

Figure 3:
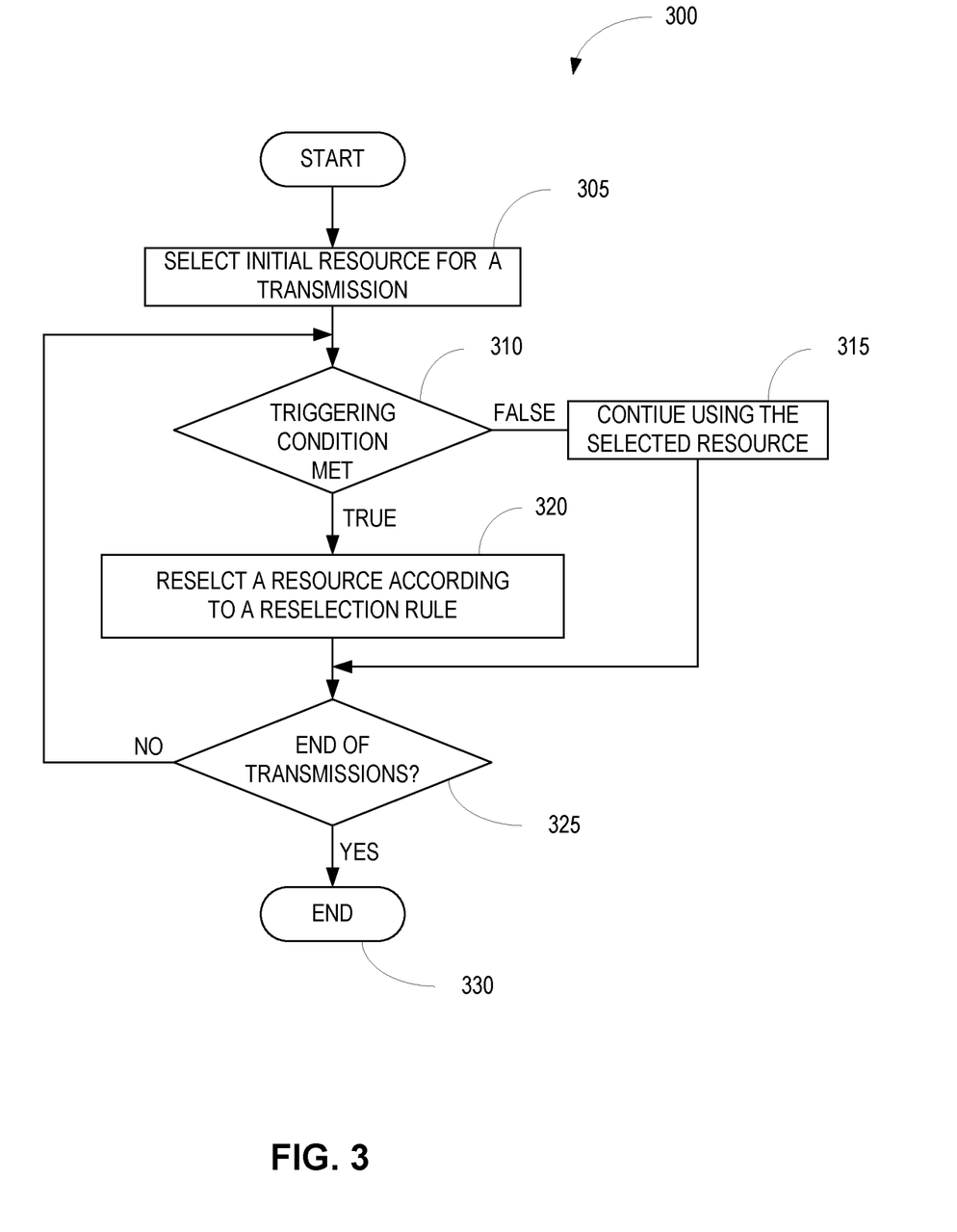
FIG. 3 is a flow chart illustrating an exemplary resource allocation method implemented by a device engaging in D2D communications.

FIG. 3 illustrates an exemplary distributed resource allocation method 300 implemented on a wireless device 200 that is configured to communicate with other wireless devices 200 in a D2D network 100 that share the same pool of time-frequency resources. After system initialization, the wireless device 200, selects an initial radio resource for transmitting to other wireless devices 200 (block 305). In some embodiments, the wireless device 200 selects the initial resource according to the selection rule given in Equation (1). After the initial resource selection, the wireless device 200 transmits using the selected resource. Because the radio environment within the D2D network 100 changes over time, the initial resource selected by the wireless device 200 in block 305 may no longer be optimal after a period of time. Accordingly, the wireless device 200 is configured to reselect a resource when a trigger condition is detected. To determine whether a resource reselection is needed, the wireless device 200 checks the triggering condition (block 310). If the triggering condition is false or no triggering condition is detected, the wireless device 200 will continue using the same resource (block 315). If the triggering condition is true or the triggering condition is detected, the wireless device 200 will perform resource reselection according to a reselection rule (block 320). The wireless device 200 then checks whether the transmission is complete (block 325). If not, the wireless device 200 will return to block 305 and repeat the reselection process until the transmission is complete. When the transmission is complete, the method ends (block 330).

Figure 4:
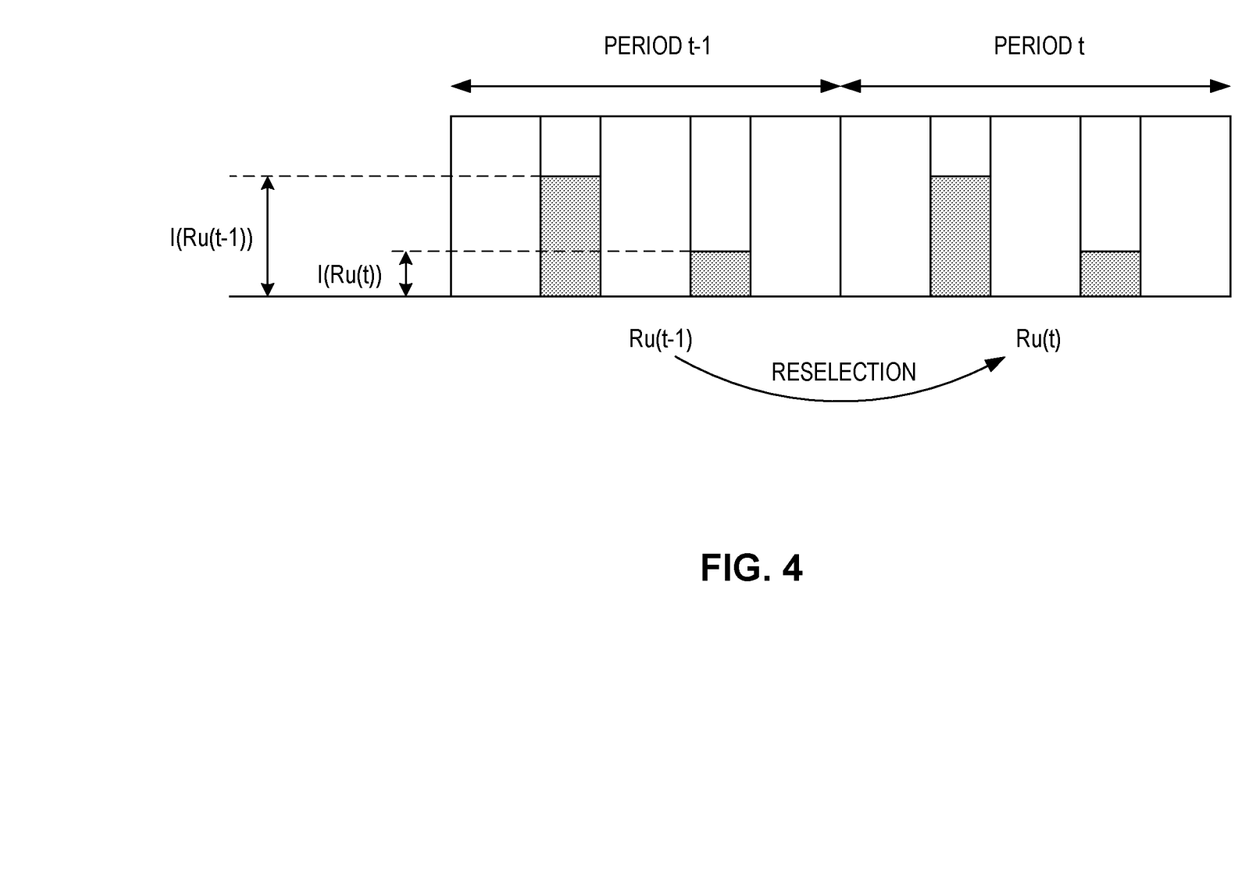
FIG. 4 illustrates a resource reselection in which resources used during period t−1 are replaced by newly selected resourced during period t.

FIG. 4 illustrates an exemplary resource reselection according to one exemplary embodiment. In this example, a wireless device 200 measures or senses the interference levels on two resource units denoted as $Ru(t-1)$ and $Ru(t)$. The resource unit $Ru(t-1)$ is the resource selected at time $t-1$ and is the resource currently in use. The resource unit $Ru(t)$ is a candidate resource and is available for selection at time t. The wireless device 200 measures the interference on the resource $Ru(t-1)$ and $Ru(t)$. The interference measurements, denoted as $I(Ru(t-1))$ and $I(Ru(t))$, are performed at time period $t-1$. The interference measurements are used as inputs to the triggering condition given by Equation (4). The wireless device 200 in this example determines that the triggering condition is satisfied because the difference between the interference measurements exceeds an interference threshold. Accordingly, the wireless device 200 reselects $Ru(t)$ for use at time period t.

Figure 5:
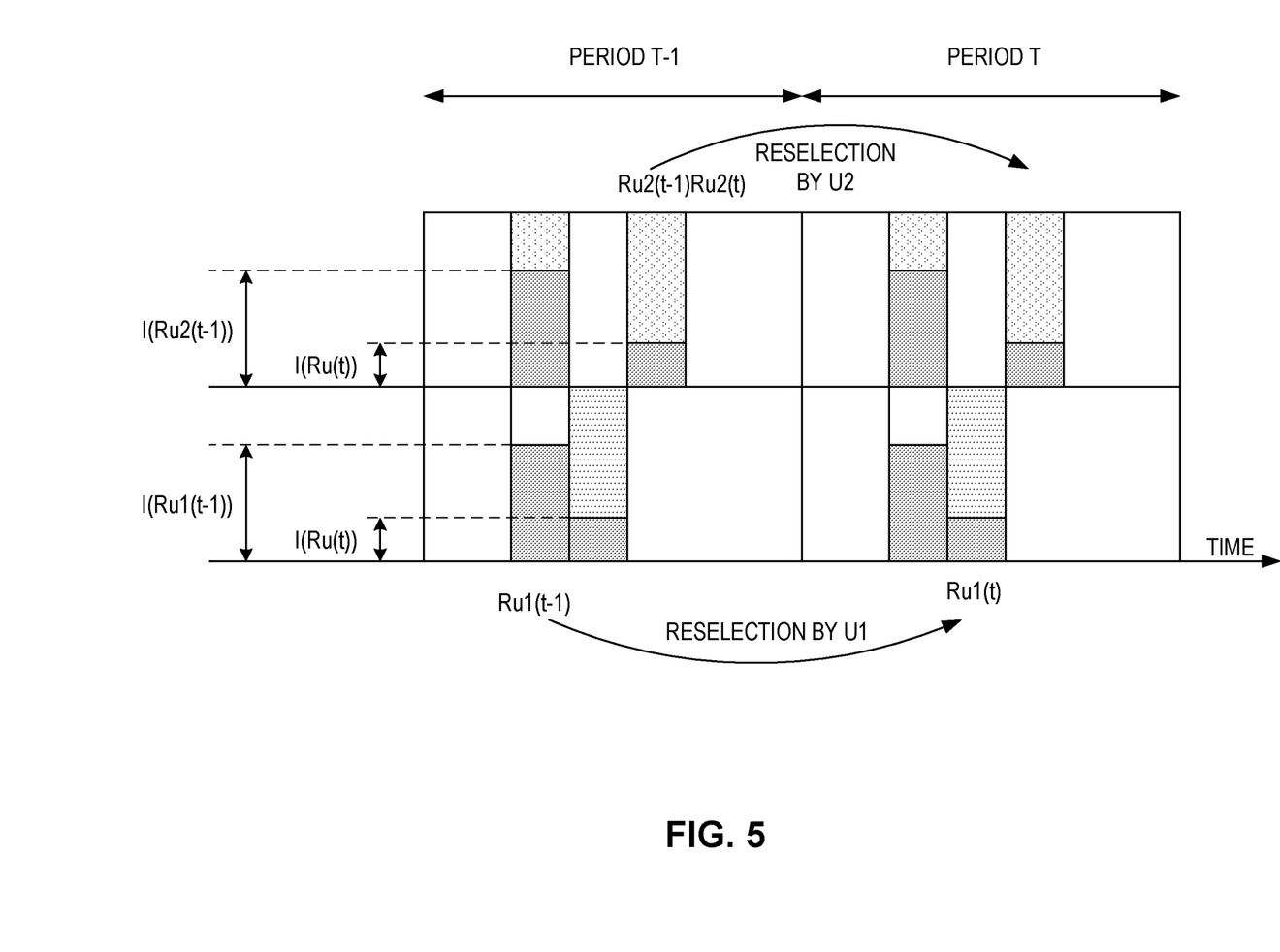
FIG. 5 illustrates a device specific resource reselection for two devices showing how resource collision may be avoided.

FIG. 5 illustrates how device-specific reselection can help avoid resource collisions in the distributed allocation method. In the example shown in FIG. 5, two wireless devices 200, denoted U1 and U2, are transmitting in the same time slot during period $t-1$, but are multiplexed in frequency. Consequently, the wireless devices 200 cannot receive each other's transmissions due to half duplex constraints. The wireless devices 200 are configured to sense the interference levels on other candidate resources in the resource pool. Because the wireless devices 200 are closely located, they both measure nearly identical levels of interference on the candidate resources. In this scenario, reselection without any constraints may lead to a resource collision where the two wireless devices 200 select the same resource. However, if a device specific reselection rule is applied, such collisions can be avoided. In this example, it is assumed that the triggering condition for both wireless devices 200 is satisfied and that both wireless devices 200 therefore perform a reselection at time t. In this example, the wireless devices 200 are constrained to reselect time resources that are a circular shift of the currently used resource. The circular shift is denoted by k, where k represents the number of permanent slots for the circular shift. If the wireless devices 200 use different values for k, the two wireless devices 200 will reselect different time slots at time T. In the example shown in FIG. 6, k=1 for U1 and k=2 for U2. Thus, the wireless devices 200 are able to communicate after the reselection.

Figure 6:
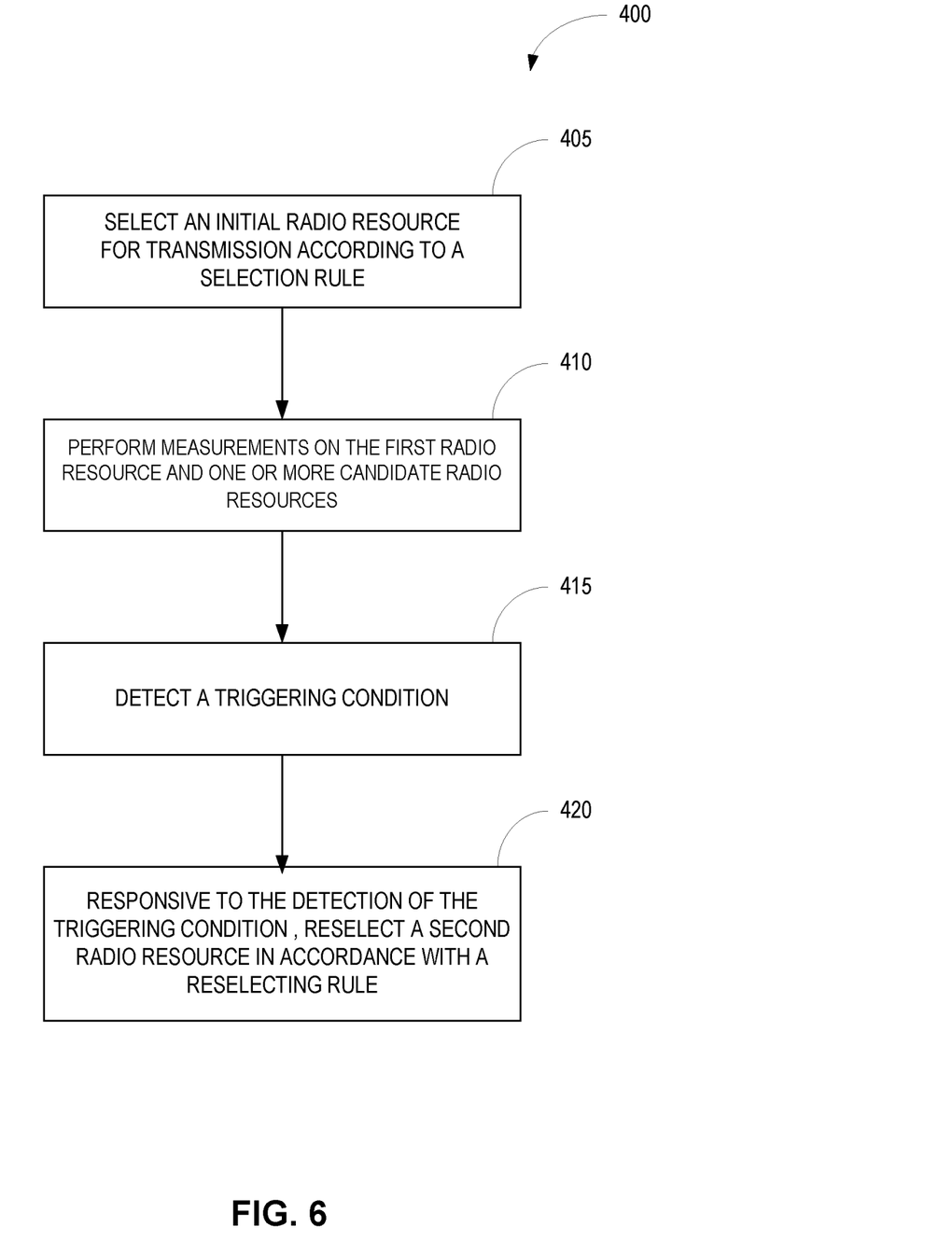
FIG. 6 illustrates an exemplary distributed resource allocation method implemented by a device engaging in D2D communications.

FIG. 6 illustrates an exemplary resource reselection method 400 implemented on the wireless device 200 according to one exemplary embodiment. The wireless device 200 initially selects a first radio resource for transmission of signals according to a selection rule (block 405). The wireless device 200 performs measurements on the first radio resource and one or more candidate radio resources while the wireless device 200 is transmitting (block 410). Before the transmission is complete, the wireless device 200 detects a triggering condition (block 415). In some embodiments, the triggering condition may be detected based on the measurements. Responsive to the detection of the triggering condition, the wireless device 200 reselects a second radio resource from the one or more candidate radio resources in accordance to a reselection rule (block 420). In some embodiments, the reselection rule is different from the selection rule. Also, in some embodiments, the reselection rule is device-specific so that different wireless devices 200 apply the reselection rule differently to reduce the chances of a resource collision.

Figure 7:
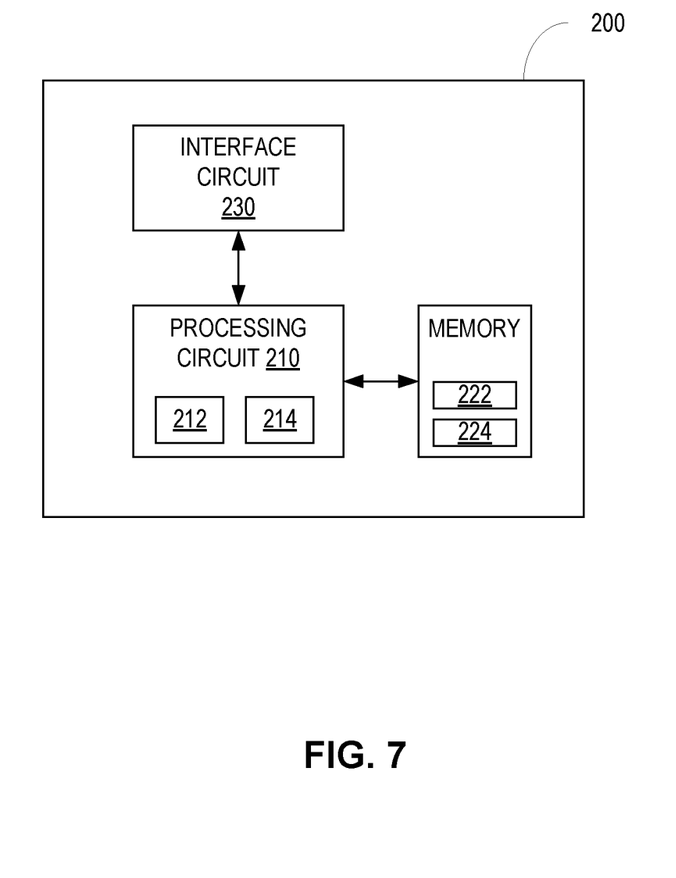
FIG. 7 illustrates an exemplary device configured to reselect resources in accordance to a reselection rule designed to reduce resource collisions among devices engaging in D2D communications.

FIG. 7 illustrates an exemplary wireless device 200 configured to perform a resource reselection method as shown in FIG. 3. The wireless device 200 comprises a processing circuit 210, memory 220, and interface circuit 230. The processing circuit 210 may comprise one or more microprocessors, microcontrollers, digital signal processors, hardware, firmware or a combination thereof. The processing circuit 210 is configured to select radio resources for transmitting signals to one or more other wireless devices 200 from a pool of shared resources as hereinabove described. The memory 220 is configured to store computer programs and/or instructions that, when executed, by the processing circuit 210, cause the wireless device 200 to perform the resource reselection methods described above. The interface circuit 230 may, for example, comprise a transceiver configured to operate according to the LTE Rel-12 standard. Those skilled in the art will appreciate, however, that the interface circuit 230 may operate according to other standards.

In one embodiment, the processing circuit 210 comprises a measurement unit 212 and resource selection unit 214. The measurement unit 212 comprises circuitry that is configured to perform measurements or sense the radio environment as hereinabove described and to provide the measurements to the resource selection unit 214. In one embodiment, the measurement unit 212 measures the interference on the resources in the resource pool. The resource selection unit 214 comprises circuitry configured to select/reselect resources from the shared pool of resources based on the measurements provided by the measurement unit 212. In one embodiment, the resource selection unit 214 is configured to select an initial radio resource from a set of candidate resources according a selection rule, to detect a triggering condition, and to reselect a second radio resource from the one or more candidate radio resources in accordance to a reselection rule responsive to the triggering condition.

In one embodiment, memory 220 may store a measurement module 222 and resource selection module 224. The measurement module 222 comprises executable program code that is executed by the processing circuit 210 to perform measurements or sense the radio environment as hereinabove described. In one embodiment, the measurement module 222 comprises program code for measuring the interference associated with the resources in the resource pool. The resource selection module 224 comprises program code that is executed by the processing circuit 210 to select/reselect resources from the shared pool of resources based on the measurements provided by the measurement unit 212. In one embodiment, the resource selection module 224 comprises executable program code to select an initial radio resource from a set of candidate resources according a selection rule, to detect a triggering condition, and to reselect a second radio resource from the one or more candidate radio resources in accordance to a reselection rule responsive to the triggering condition.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of selecting radio resources by a device for use in device-to-device communications with one or more other devices, said method comprising:
    selecting, according to a selection rule, a first radio resource from a shared pool of radio resources for transmission of signals;
    performing measurements on the first radio resource and one or more candidate radio resources in the shared pool of radio resources;
    detecting a triggering condition based at least in part on the measurements; and
    responsive to the detection of the triggering condition, reselecting a second radio resource from the one or more candidate radio resources in the shared pool of radio resources according to a reselection rule, wherein the reselection rule comprises a device-specific pattern, wherein the first radio resource comprises a time resource and a frequency resource, and wherein the device-specific pattern comprises a circular shift of the time resource by a device-specific number of time units.

2. The method of claim 1, wherein selecting the first radio resource from the shared pool of radio resources for the transmission of signals according to the selection rule comprises selecting a radio resource based on a first utility function.

3. The method of claim 2, wherein selecting the first radio resource based on the first utility function comprises selecting said radio resource from the shared pool of radio resources that maximizes the first utility function.

4. The method of claim 2, wherein selecting the first radio resource based on the first utility function comprises:
    ranking available radio resources in the shared pool of radio resources based on the first utility function; and
    selecting one of the available radio resources from among the n highest ranked radio resources.

5. The method of claim 4, wherein selecting the one of the available radio resources from among the n highest ranked radio resources comprises randomly selecting one of the n highest ranked radio resources.

6. The method of claim 4, wherein the one of the available radio resources is selected from among the n highest ranked radio resources according to the device-specific pattern.

7. The method of claim 1, wherein the reselection rule is different from the selection rule.

8. The method of claim 2, wherein reselecting the second radio resource from the one or more candidate radio resources according to the reselection rule further comprises reselecting the second radio resource based on a second utility function.

9. The method of claim 8, wherein reselecting the second radio resource based on the second utility function further comprises reselecting the second radio resource from the shared pool of radio resources that maximizes the second utility function.

10. The method of claim 8, wherein reselecting the second radio resource based on the second utility function further comprises:
    ranking available radio resources in the shared pool of radio resources based on the second utility function; and
    reselecting one of the available radio resources from among the n highest ranked radio resources.

11. The method of claim 10, wherein reselecting the one of the available radio resources from among the n highest ranked radio resources further comprises randomly selecting one of the n highest ranked radio resources.

12. The method of claim 10, wherein the one of the available radio resources is reselected from among the n highest ranked radio resources according to the device-specific pattern.

13. The method of claim 8, wherein the first utility function and the second utility function are different.

14. The method of claim 1, wherein reselecting the second radio resource from the one or more candidate radio resources according to the reselection rule comprises reselecting the second radio resource according to the device-specific pattern to reduce resource collision between the device and the one or more other devices.

15. The method of claim 14, wherein reselecting the second radio resource from the one or more candidate radio resources according to the device-specific pattern further comprises reselecting the second radio resource based on the time resource of the first radio resource and the frequency resource of the first radio resource.

16. The method of claim 1, wherein:
the triggering condition is based on at least one of a utility of the first radio resource and a utility of the second radio resource; and
the utility of the first radio resource and the utility of the second radio resource are based on the measurements.

17. The method of claim 16, wherein the utility of the first radio resource and the utility of the second radio resource are based on respective utility functions that are different.

18. The method of claim 16, wherein the triggering condition comprises at least one of the following: the utility of the first radio resource is below a first threshold, and the utility of the second radio resource is above a second threshold.

19. The method of claim 16, wherein the triggering condition comprises a difference between the utility of the second radio resource and the utility of the first radio resource exceeding a threshold.

20. The method of claim 1, wherein the triggering condition comprises a difference between a first measurement performed on the first radio resource and a second measurement performed on the second radio resource exceeding a threshold.

21. The method of claim 20, wherein the first and second measurements comprise interference measurements.

22. The method of claim 1, wherein the triggering condition is further based on a time threshold.

23. A device configured for device-to-device communications with one or more other devices, said device comprising:
an interface circuit operative to transmit and receive radio signals; and
a processing circuit operatively coupled to the interface circuit and configured to:
select a first radio resource from a shared pool of radio resources for transmission of the radio signals according to a selection rule;
perform measurements on the first radio resource and one or more candidate radio resources in the shared pool of radio resources;
detect a triggering condition based at least in part on the measurements; and
responsive to the detection of the triggering condition, reselect a second radio resource from the one or more candidate radio resources in the shared pool of radio resources according to a reselection rule, wherein the reselection rule comprises a device-specific pattern, wherein the first radio resource comprises a time resource and a frequency resource, and wherein the device-specific pattern comprises a circular shift of the time resource by a device-specific number of time units.

24. The device of claim 23, wherein the processing circuit is further configured to select the first radio resource based on a first utility function.

25. The device of claim 24, wherein the processing circuit is further configured to select the first radio resource from the shared pool of radio resources that maximizes the first utility function.

26. The device of claim 24, wherein the processing circuit is further configured to:
rank available radio resources in the shared pool of radio resources based on the first utility function; and
select one of the available radio resources from among the n highest ranked radio resources.

27. The device of claim 26, wherein the processing circuit is further configured to randomly select the one of the available radio resources.

28. The device of claim 26, wherein the processing circuit is further configured to select the one of the available radio resources from among the n highest ranked radio resources according to the device-specific pattern.

29. The device of claim 23, wherein the reselection rule is different from the selection rule.

30. The device of claim 24, wherein the processing circuit is further configured to reselect the second radio resource based on a second utility function.

31. The device of claim 30, wherein the processing circuit is further configured to reselect the second radio resource from the shared pool of radio resources that maximizes the second utility function.

32. The device of claim 30, wherein the processing circuit is further configured to:
rank available radio resources in the shared pool of radio resources based on the second utility function; and
reselect one of the available radio resources from among the n highest ranked radio resources.

33. The device of claim 32, wherein the processing circuit is further configured to randomly reselect the one of the available radio resources.

34. The device of claim 33, wherein the processing circuit is further configured to reselect the one of the available radio resources from among the n highest ranked radio resources according to the device-specific pattern.

35. The device of claim 30, wherein the first utility function and the second utility function are different.

36. The device of claim 23, wherein the processing circuit is further configured to reselect the second radio resource according to the device-specific pattern to reduce resource collision between the device and the one or more other devices.

37. The device of claim 36, wherein the processing circuit is further configured to reselect the second radio resource based on the time resource of the first radio resource and the frequency resource of the first radio resource.

38. The device of claim 23, wherein:
the triggering condition is based on at least one of a utility of the first radio resource and a utility of the second radio resource; and
the utility of the first radio resource and the utility of the second radio resource are based on the measurements.

39. The device of claim 38, wherein the utility of the first radio resource and the utility of the second radio resource are based on respective utility functions that are different.

40. The device of claim 38, wherein the triggering condition comprises at least one of: the utility of the first radio resource is below a first threshold, and the utility of the second radio resource is above a second threshold.

41. The device of claim 38, wherein the triggering condition comprises a difference between the utility of the second radio resource and the utility of the first radio resource exceeding a threshold.

42. The device of claim 23, wherein the triggering condition comprises a difference between a first measurement performed on the first radio resource and a second measurement performed on the second radio resource exceeding a threshold.

43. The device of claim 42, wherein the first and second measurements comprise interference measurements.

44. The device of claim 23, wherein the triggering condition is further based on a time threshold.

45. A non-transitory, computer-readable medium storing computer-executable instructions that, when executed by a processing circuit in a device, configures the device to perform operations corresponding to the method of claim 1.

* * * * *